US012759284B2

(12) United States Patent
Hofmann et al.

(10) Patent No.: US 12,759,284 B2
(45) Date of Patent: Oct. 13, 2026

(54) INSPECTION DEVICE FOR A CONVERTING MACHINE

(71) Applicant: BOBST MEX SA, Mex (CH)

(72) Inventors: Thomas Hofmann, Genève (CH); Mauro Truscello, Romanel-sur-Lausanne (CH); Felix Mathys, Cully (CH)

(73) Assignee: BOBST MEX SA, Mex (CH)

( * ) Notice: Subject to any disclaimer, the term of this patent is extended or adjusted under 35 U.S.C. 154(b) by 270 days.

(21) Appl. No.: 18/580,058

(22) PCT Filed: Jul. 14, 2022

(86) PCT No.: PCT/EP2022/069769
§ 371 (c)(1),
(2) Date: Jan. 17, 2024

(87) PCT Pub. No.: WO2023/001689
PCT Pub. Date: Jan. 26, 2023

(65) Prior Publication Data
US 2024/0300234 A1 Sep. 12, 2024

(30) Foreign Application Priority Data
Jul. 22, 2021 (EP) .................................... 21187122

(51) Int. Cl.
*B41F 33/00* (2006.01)
*G03B 17/55* (2021.01)

(52) U.S. Cl.
CPC ...... *B41F 33/0036* (2013.01); *B41F 33/0081* (2013.01); *G03B 17/55* (2013.01)

(58) Field of Classification Search
CPC .... B41F 33/0036; B41F 33/0081; B41F 5/24; G03B 17/55
See application file for complete search history.

(56) References Cited

U.S. PATENT DOCUMENTS 6,710,798 B1 * 3/2004 Hershel .............. G01R 31/2887 356/243.1
8,073,239 B1 12/2011 Bahrami et al.
2004/0012775 A1 * 1/2004 Kinney .............. G01N 21/9501 356/237.2
2004/0195676 A1 * 10/2004 Quarre .................... H10F 77/60 257/713
2013/0181396 A1 * 7/2013 Liu ........................ B65H 29/62 271/283
2017/0017144 A1 1/2017 Izukawa et al.
(Continued)

FOREIGN PATENT DOCUMENTS

CN 101216349 A * 7/2008
CN 103987524 A 8/2014
(Continued)

*Primary Examiner* — Stephen G Sherman
(74) *Attorney, Agent, or Firm* — Bookoff McAndrews PLLC

(57) ABSTRACT

The invention relates to an inspection device (42) for a converting machine (10), the inspection device comprising a camera (49) configured to capture an image of a portion of a blank (1) provided with a reference mark (30). The camera is arranged inside an external housing shroud (70), and wherein a thermoelectric element (78) is arranged between the camera and the external housing shroud.

20 Claims, 10 Drawing Sheets

(56) References Cited

U.S. PATENT DOCUMENTS

| | | | | |
|---|---|---|---|---|
| 2019/0028617 | A1* | 1/2019 | Odom | G06T 1/20 |
| 2019/0306966 | A1* | 10/2019 | Byrne | G02B 7/028 |
| 2019/0340740 | A1 | 11/2019 | Li et al. | |
| 2021/0170766 | A1 | 6/2021 | Vankouwenberg et al. | |

FOREIGN PATENT DOCUMENTS

| | | | | | |
|---|---|---|---|---|---|
| CN | 107000866 | A | | 8/2017 | |
| EP | 0634648 | A1 | * | 1/1995 | G01N 21/8806 |
| ES | 2244268 | A1 | * | 12/2005 | F25B 21/04 |
| JP | 2003166809 | A | * | 6/2003 | |
| JP | 2010175835 | A | | 8/2010 | |
| KR | 20180045619 | A | | 5/2018 | |
| KR | 20210002980 | A | | 1/2021 | |
| WO | 2009135539 | A1 | | 11/2009 | |
| WO | WO-2016069086 | A1 | * | 5/2016 | A61B 5/0077 |
| WO | 2021008764 | A1 | | 1/2021 | |

* cited by examiner

INSPECTION DEVICE FOR A CONVERTING MACHINE

CROSS-REFERENCE TO RELATED APPLICATION(S)

This application is a National Stage Application under 35 U.S.C. § 371 of International Application No. PCT/EP2022/069769, filed on Jul. 14, 2022, which claims priority to European Application No. 21187122.3, filed on Jul. 22, 2021, the entireties of which are incorporated herein by reference.

FIELD OF THE INVENTION

The present invention relates to a converting machine for producing packaging containers such as flat-packed or folding boxes. In particular, the invention relates to an inspection system for detecting positions and alignments of printed colors and coatings.

BACKGROUND OF THE INVENTION

Converting machines can be configured to produce packaging containers such as flat-packed or folding boxes from sheets substrates which are printed, cut and scored to form blanks. These blanks can subsequently be folded and assembled into three-dimensional boxes. The boxes are designed to be folded either manually or automatically in a folder-gluer machine.

When the packaging containers are provided with a printed motif comprising a plurality of colors and various coatings, it is required that each color or coating is in the correct position on the blank and that the colors and coatings are aligned with each other.

Inspection devices using cameras can be used to verify the position and alignment of the different colors and coatings. Ink dryer devices are frequently used at the end of flexographic printing modules where camera devices are located. Electronic processing components of the cameras are heat-sensitive and typically require an ambient temperature below 45° C. In order to cool the cameras, fans are often used which induce an airflow around the cameras.

However, the fans tend to create an accumulation of dust around the cameras which reduces the quality of the captured images.

SUMMARY OF THE INVENTION

In view of the above-mentioned problem, it is an object of the present invention to provide an inspection device which is capable of reducing the build-up of dust around the camera.

This object is solved by an inspection device according to claim 1.

According to a first aspect of the present invention, there is provided an inspection device for a converting machine, the inspection device comprising a camera configured to capture an image of a portion of a blank provided with a reference mark, the camera being arranged inside an external housing shroud, and wherein a thermoelectric element is arranged between the camera and the external housing shroud.

The present invention is based on a realization that a specific integration of a thermoelectric element in an inspection device can be designed such that the cooling effect obtained by the thermoelectric element can be sufficient to efficiently cool the camera.

In a preferred embodiment, the thermoelectric element can be a Peltier element.

The camera may comprise an optical module and an electronic processing module and wherein the electronic processing module is thermally connected to the thermoelectric element.

Preferably, an isolating inner housing is arranged inside the external housing and is enclosing the camera. The inner housing may comprise a first housing part arranged around the electronic processing module of the camera and a second housing part arranged around the optical module of the camera. The second housing part may be tubular.

In an embodiment, the first housing part comprises a recess and wherein the second housing part is partially received within the recess.

The first housing part may comprise an isolating portion and a thermally conductive portion, wherein the thermally conductive portion comprises a heat-conductive plate, and wherein the thermoelectric element is positioned between the heat-conductive plate and the external housing shroud. In such a way, the cooling is distributed and spread from the heat transfer element to the camera.

The housing shroud is preferably hermetically sealed. This provides an enhanced dust-protection of the components.

In an embodiment, a cover of the housing shroud may be provided with a glass surface. The glass surface provides an unchanged angle of incident of light rays in relation to a normal direction of the glass.

In an embodiment, a wall of the housing shroud comprises a biased section, which forms a first angle with the longitudinal extension of the external housing shroud, whereby the optical axis the camera is positioned at the first angle in relation to the vertical direction. Preferably, the biased section and the optical axis form the same angle in relation to the vertical direction.

The vertical direction coincides with the longitudinal direction of the housing shroud. The optical axis of the camera is preferably directed towards an opening in the cover.

According to a second aspect, there is provided a converting machine which comprises a flexographic printing module and a conveyance system, the conveyance system comprising at least one vacuum transfer unit, wherein the vacuum transfer unit is arranged such that a flow of air is generated around the external housing shroud.

In an embodiment, the printing module may comprise at least a first and second printing unit and wherein the inspection device is located after the second printing unit.

The vacuum transfer may be located vertically above the inspection device. Alternatively, the vacuum transfer may be located vertically below the inspection device.

BRIEF DESCRIPTION OF THE DRAWINGS

The invention will now be described by way of example and with reference to embodiments shown in the enclosed drawings, where the same reference numerals will be used for similar elements and in which.

DETAILED DESCRIPTION

Figure 1A:
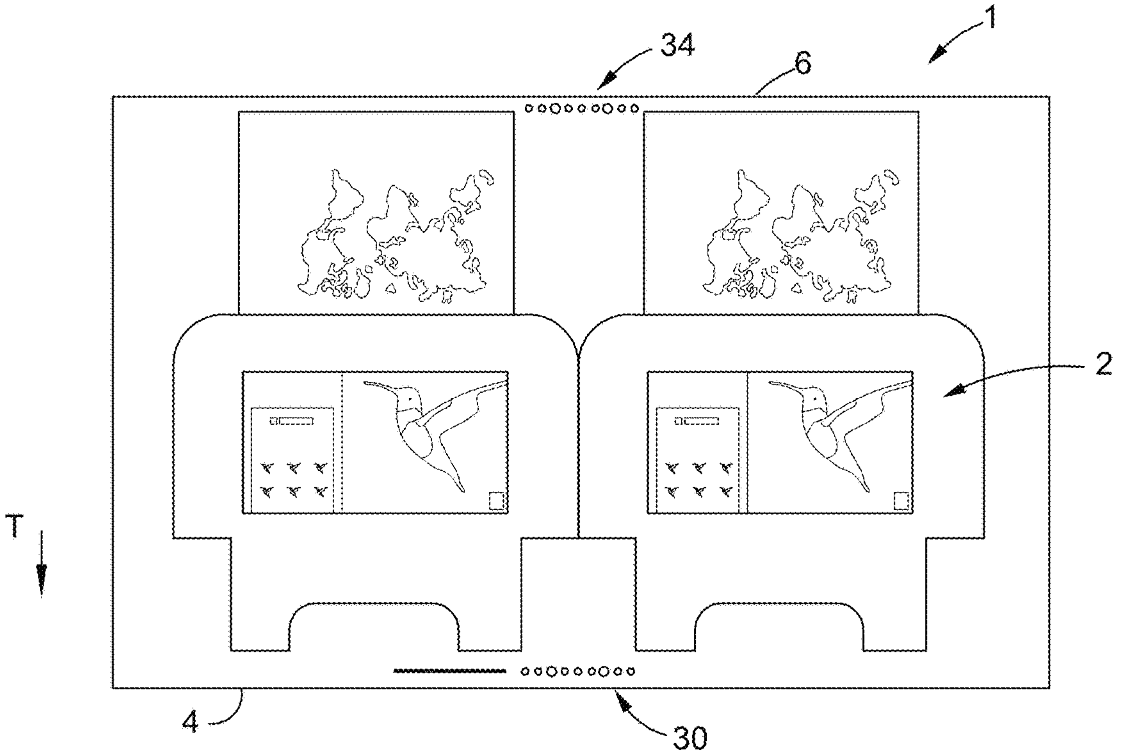
FIG. 1*a* is a schematic plan view of a blank of a box.

FIG. 1*a* illustrates an example of a blank 1 for a flat-packed or folding box. The blank 1 may be produced from cardboard, paperboard, plastics or like.

Figure 2:
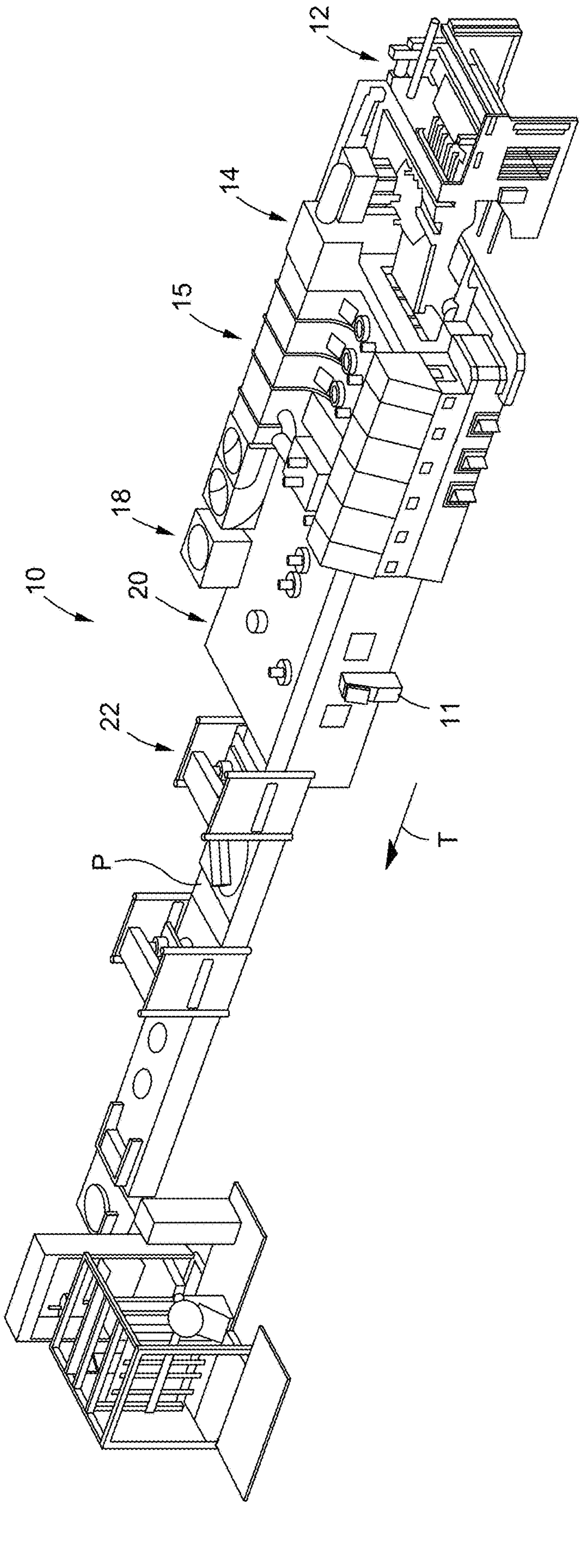
FIG. 2 is a schematic perspective view of a converting machine in the configuration of a rotary die-cutter.

The blank 1 can be produced in a converting machine 10, such as the one illustrated in FIG. 2. The converting machine 10 is in the configuration of a rotary die-cutter machine 10. At an entry position of the converting machine 10, a sheet substrate 1 is placed in a feeder module 14 and is transported in a direction of transportation T through the converting machine 10 in order to undergo a series of operations which print, cut and crease the sheet substrate 1 to form the blank 1. The direction of transportation T is defined from the inlet to the outlet of the converting machine 10. The blank 1 is transported along a transportation path P, which can be defined as the trajectory of the blank 1 through the converting machine 10.

From the inlet of the converting machine 10 and in a downstream direction along the direction of transportation T, the converting machine 10 may comprise a prefeeder 12, a feeder module 14, printing module 15, a die-cutting module 18, a bundle stacker module 20 and a palletizer-breaker 22. Optionally, a dryer module 13 can be provided after the flexographic printing module 15 and is configured to dry the ink before the blank 1 enters into the die-cutting module 18. A main operator interface 11 may also be provided in the proximity of the converting machine 10.

Figure 3:
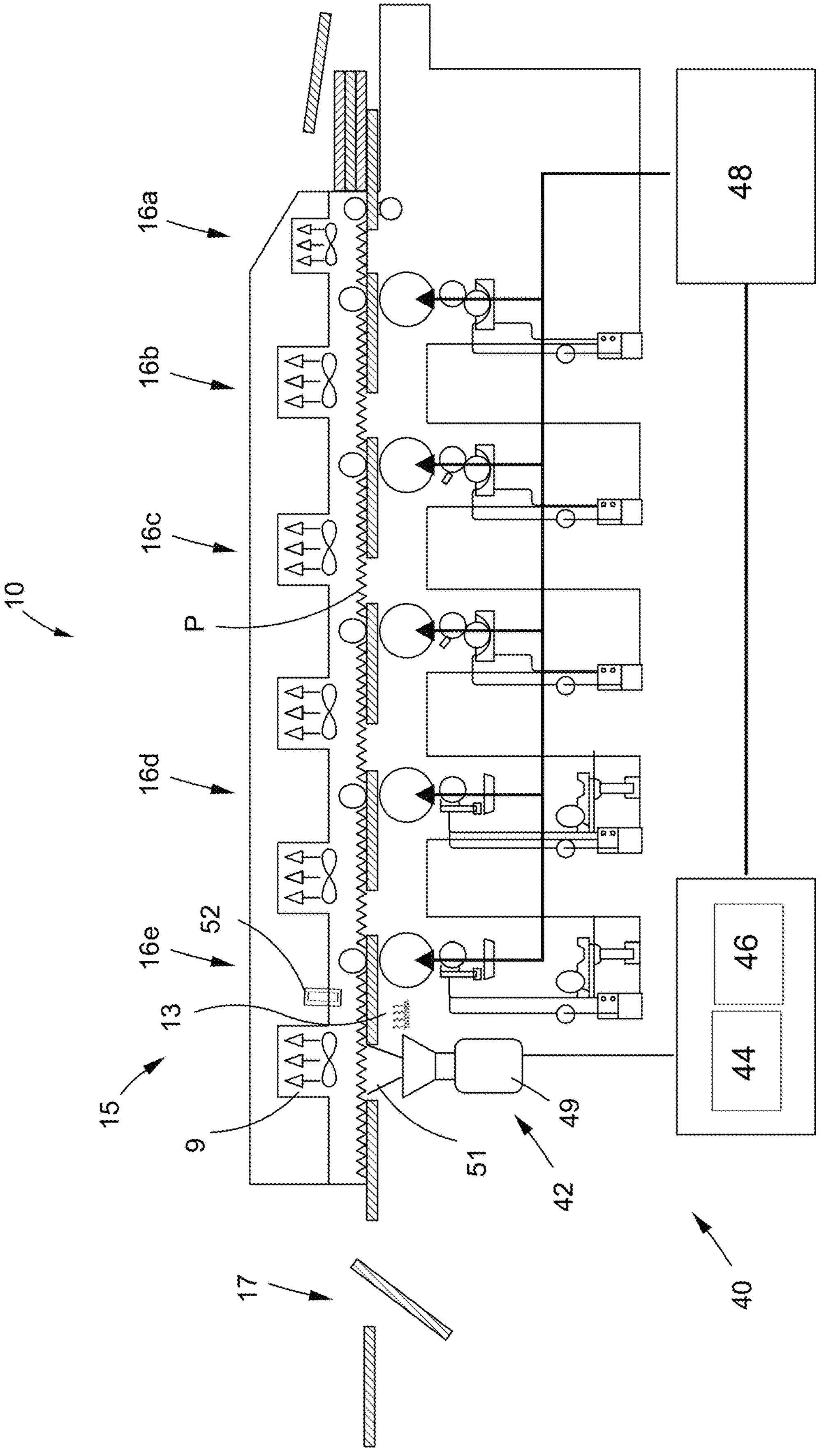
FIG. 3 is a schematic diagram of a flexographic printing module and inspection device of an embodiment of the present invention.

As illustrated in FIG. 3, the printing module 15 comprises a plurality of flexographic printing units 16*a* to 16*e*. Each flexographic printing unit 16 comprises a flexographic printing assembly including a flexographic printing cylinder and is configured to print an individual motif in a separate color or coating on the sheet substrate 1. The individual motifs together form the final motif 2 on the blank 1. Typically, at least four flexographic printing units 16*a* to 16*d* are provided in order to enable printing with different colors according to a large color palette.

Figure 1B:
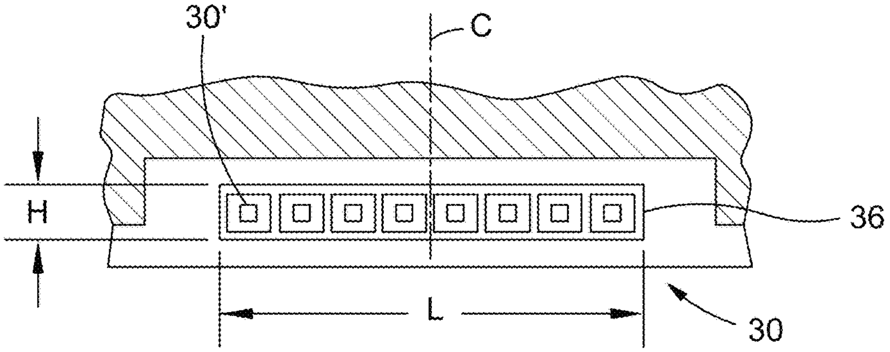
FIG. 1*b* is a detailed view of a first type of a reference mark at an edge of the blank.
Figure 1C:
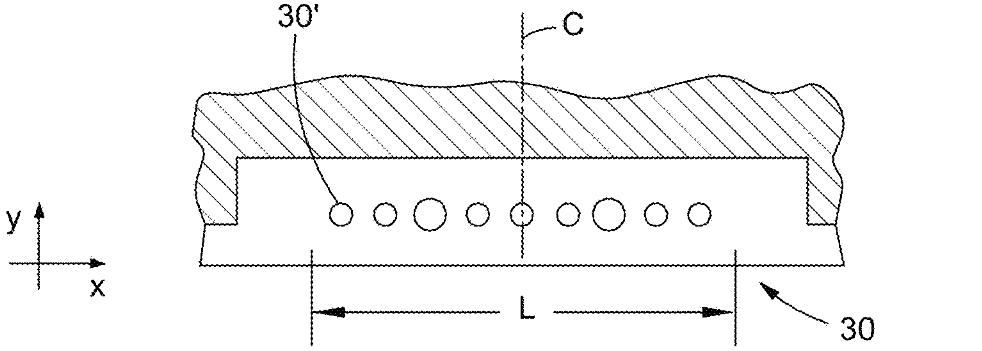
FIG. 1*c* is a detailed view of a second type of a reference mark.

As best seen in FIGS. 1*b* and 1*c*, a reference mark 30 is printed by the flexographic printing units 16 together with the motif 2. Each flexographic printing unit 16 is configured to print an individual reference mark 30' at the same time as an individual motif is being printed onto the sheet substrate 1. In such a way, a composed reference mark 30 is created by the different flexographic printing units 16. The reference mark 30 is preferably located at a front leading edge 4 of the blank 1.

Optionally, an additional second reference mark 34 can be provided on the trailing edge 6 of the blank 1. A reference mark 30 on both the front leading edge 4 and the trailing edge 6 facilitates the determination of rotational displacement shifts of the sheet substrate 1 in the flexographic printing module 15.

As shown in FIG. 1*b*, the reference mark 30 may comprise a grid 36 and a plurality of dot-shaped individual reference marks 30' arranged in the grid 36. The grid 36 is typically printed by the first flexographic printing unit 16*a* together with a separate dot-shaped reference mark 30' of a first color. The grid 36 is provided with a predetermined height H and length L.

As the sheet substrate 1 is conveyed through the flexographic printing module 15, each flexographic printing unit 16 is printing a dot-shaped reference mark 30' in the grid 36. If the colors and coatings are aligned and thus perfectly registered, each dot-shaped reference mark 30' is located in a predetermined position in the grid 36, such as in the center of the grid 36.

Alternatively, as illustrated in FIG. 1*c*, the grid 36 can be excluded and only a dot-shaped reference mark 30' is printed by each flexographic printing unit 16. This reference mark 30 displays the positions and alignment of the different colors and coatings in two dimensions by interrelated distances in X- and Y-coordinates.

As illustrated in FIG. 3, the converting machine 10 comprises a printing quality control system 40 configured to detect the positions and alignment between the different individual motifs transferred from each flexographic printing unit 16 onto the sheet substrate 1. The printing quality control system 40 comprises an inspection device 42, a control unit 44 and a memory 46.

The printing quality control system 40 is configured to detect and measure a longitudinal displacement and a lateral displacement between the different colors and coatings in the reference mark 30. In such a way, the printing register, i.e. the positions and the alignment between the different colors and coatings can be determined. If the printing units 16 are not correctly registered in relation to each other, the final motif 2 will show a misalignment of individual motifs printed in different colors.

The printing quality control system 40 is configured to calculate longitudinal and lateral displacements and send corrective information to a central control system 48 of the converting machine 10. The corrective information includes required adjustments in the angular and lateral positions of the printing cylinders of the printing module 15. The converting machine 10 may be configured to automatically adjust the angular and lateral positions of the printing cylinders. Alternatively, the printing quality system 40 can display corrective information needed for a manual adjustment of the printing module 15 on a machine interface 11.

If the printing quality control system 40 detects defective blanks 1 with misaligned colors and coatings, the central control system 48 can send information to an ejector module 17, which discards the blank 1.

As best seen in FIGS. 4, 6, 7*a* and 7*b*, the inspection device 42 comprises an imaging system 49 and an illumination system 50. The imaging system 49 can be a camera 49 with an active pixel sensor (e.g. a CMOS sensor) with an interface protocol configured to deliver images to the control unit 44. The camera 49 is configured to receive light rays from the blank 1 within its field of view 51.

Figure 8:
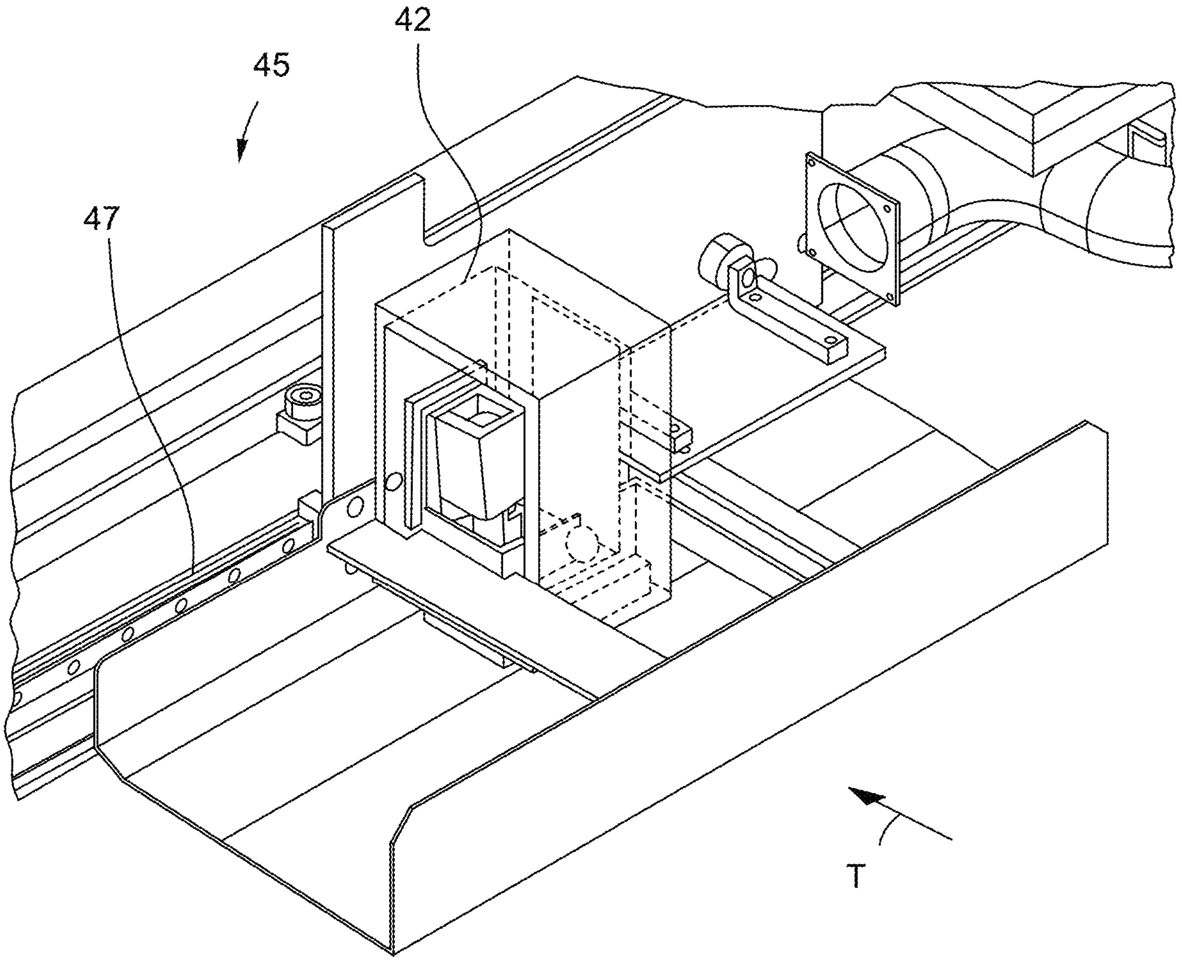
FIG. 8 is a schematic cross-sectional view illustrating the mounting of the inspection device inside the converting machine.

As illustrated in FIG. 8, the inspection device 42 can be mounted to a slide rail system 45, also referred to as a "sliding rail system 45". The slide rail system 45 comprises a longitudinal sliding rail 47 extending in perpendicular to the direction of transportation T.

An optical sensor 52 may be placed upstream and in proximity with the camera 49 and is configured to detect the arrival of the front leading edge 4 of the blank 1. The camera 49 is triggered by a time signal from the control unit 44 which is issued when the optical sensor 52 registers a detection of the front leading edge 4 of the blank 1.

The inspection device 42 is mounted downstream of the flexographic printing module 15. As illustrated in FIG. 3, the inspection device 42 is located below the transportation path P of the blank 1. However, it is also possible 30 to position the inspection device 42 above the above transportation path P of the blank 1. The inspection device 42 is thus located such that the illumination system 50 and the field of view 51 of the camera 49 are directed towards the printed side of blank 1. If the converting machine 10 is provided with a dryer module 13, the inspection device 42 can be located after the flexographic printing module 15 and the dryer module 13. Alternatively, the inspection device can be located between the flexographic printing module 15 and the dryer module 13.

Figure 6:
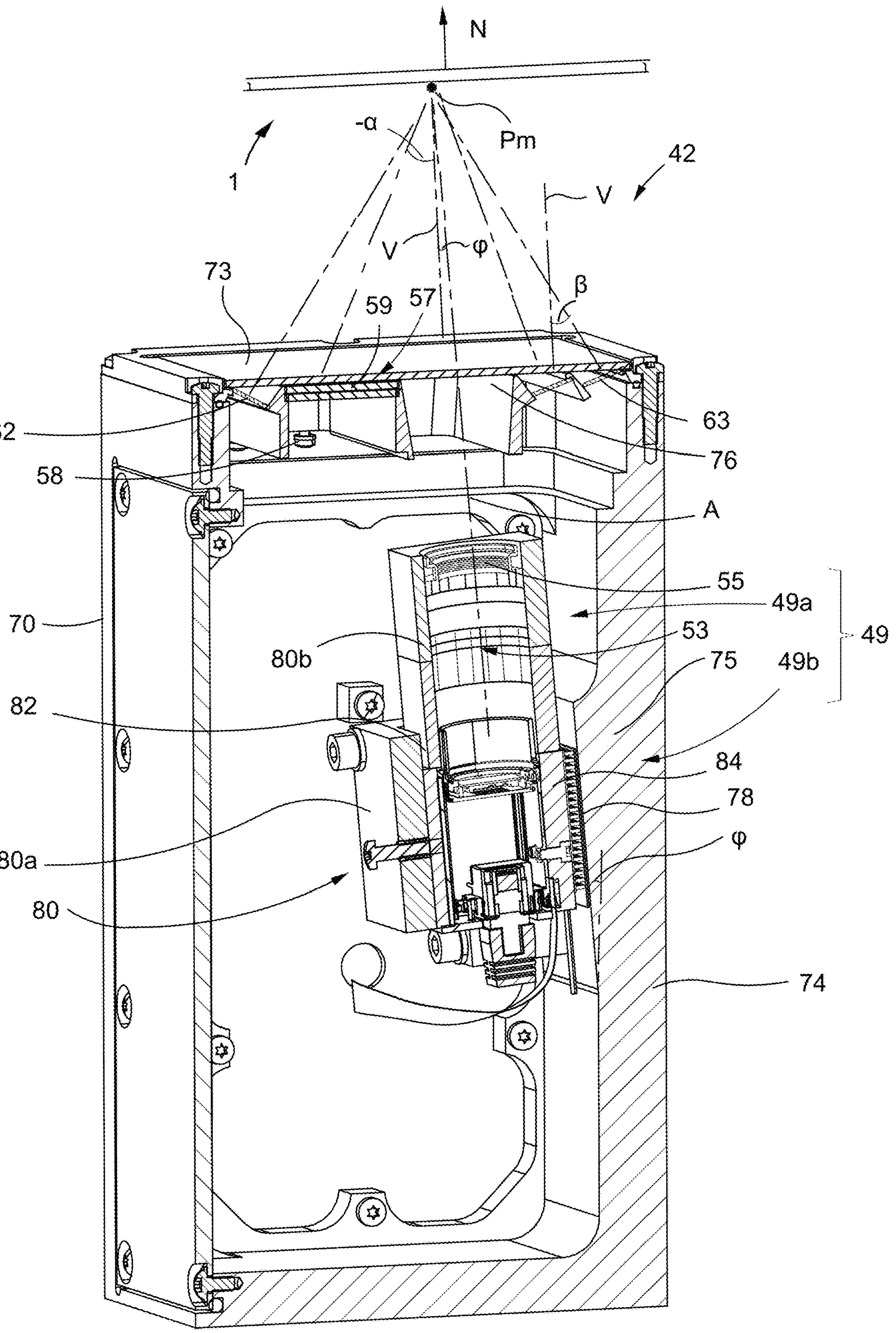
FIG. 6 is a schematic cross-sectional view illustrating the mounting of a camera inside the inspection device.
Figure 7A:
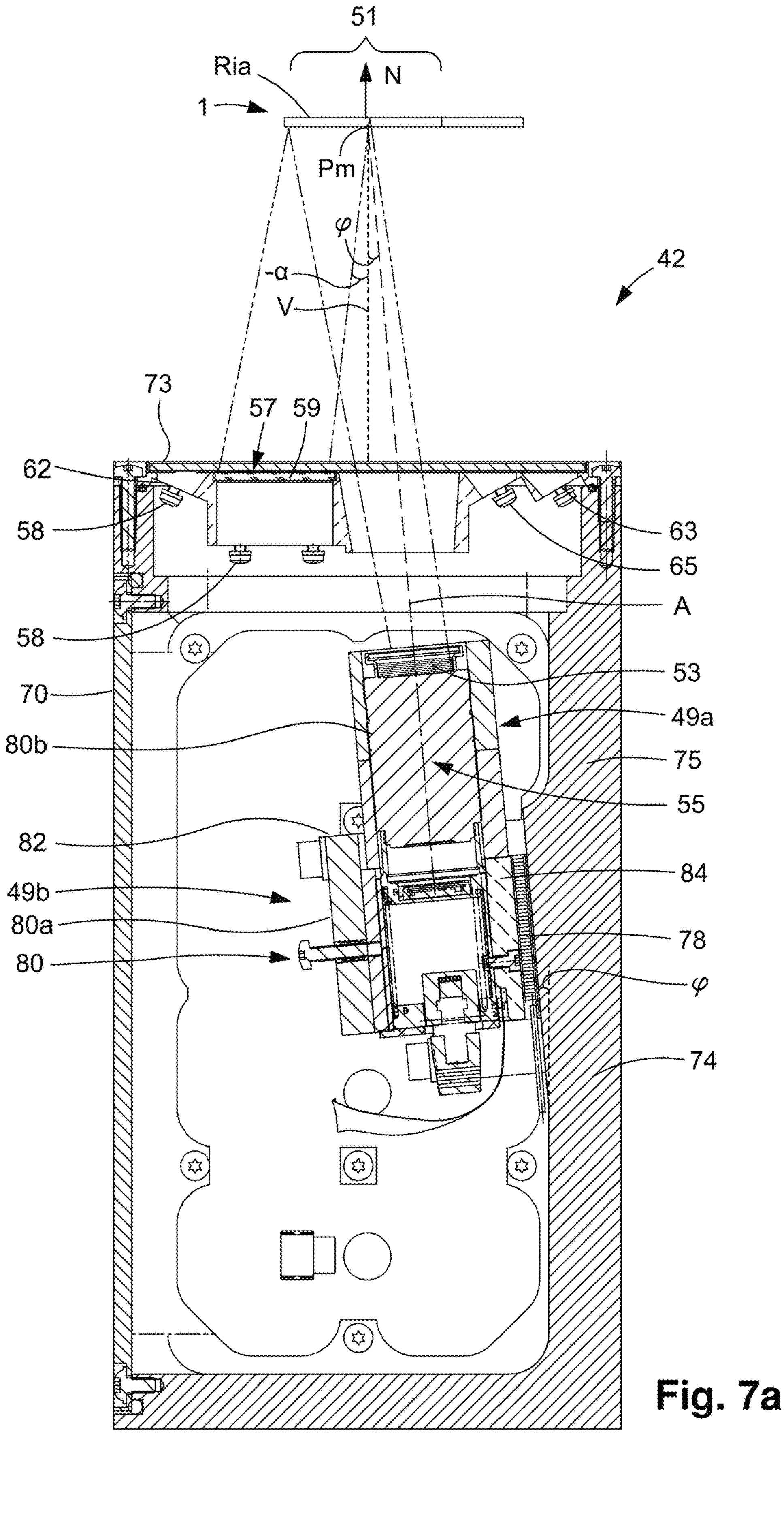
FIG. 7*a* is a schematic cross-sectional view showing emitted light rays from a first illumination module against a blank.
Figure 7B:
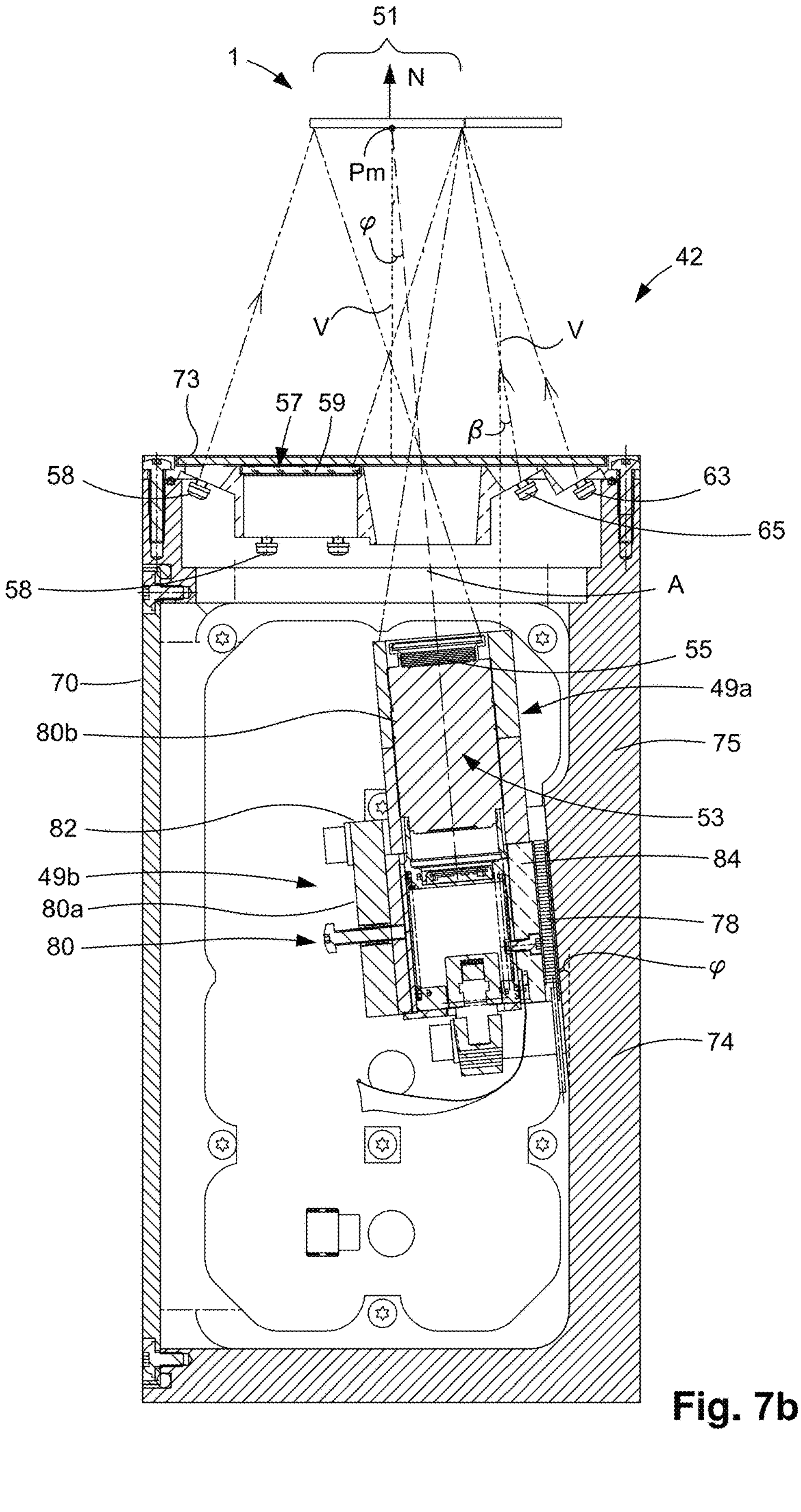
FIG. 7*b* is a schematic cross-sectional view showing emitted light rays from a second illumination module against a blank.

As best seen in FIGS. 6, 7*a* and 7*b*, the camera 49 has an optical axis A, which is a straight line passing through the geometrical center of a lens 53 of the camera 49. The optical axis A is arranged at a first angle φ in relation to the direction defined by the normal vector N.

Figure 4:
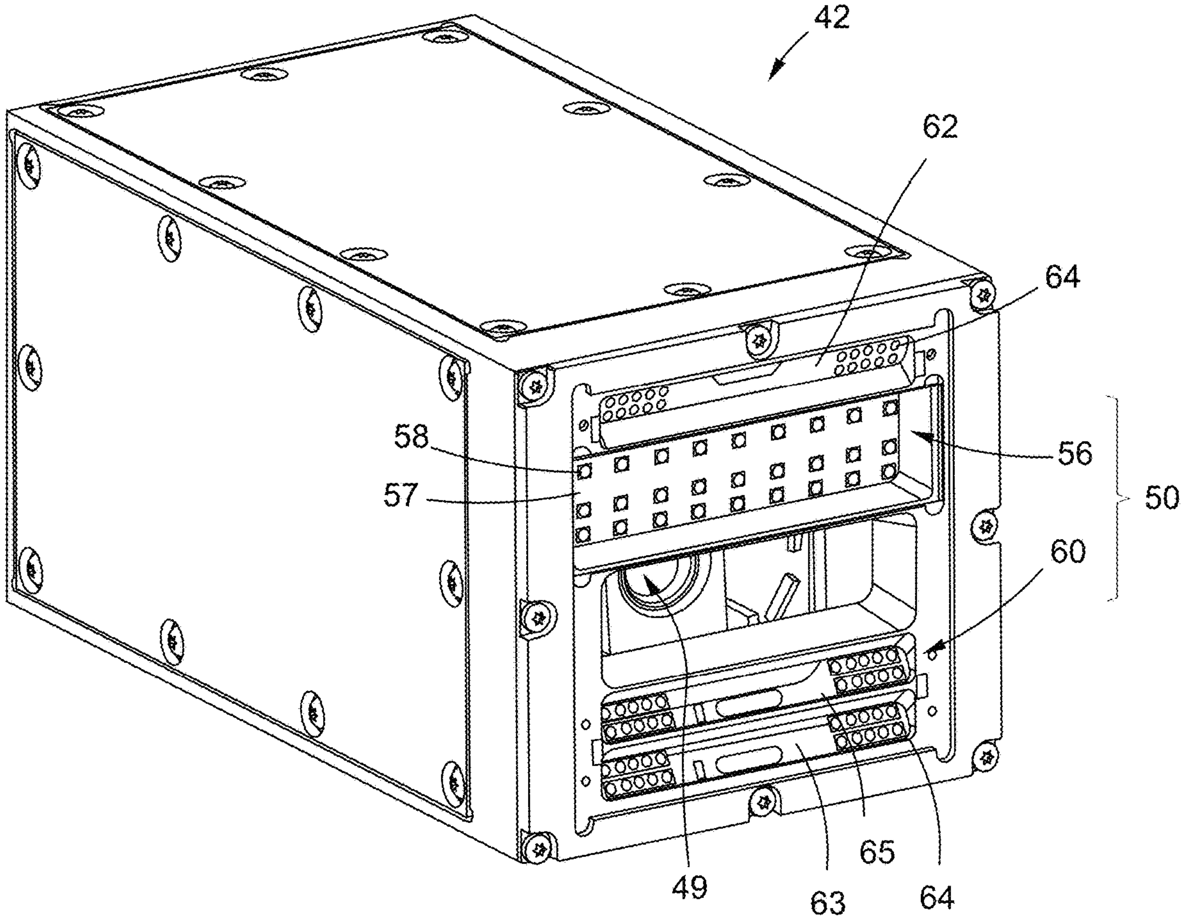
FIG. 4 is schematic perspective view of an inspection device according to an embodiment of the present invention.

As illustrated in FIG. 4, the illumination system 50 comprises a first illumination module 56 comprising at least one illumination unit 57. Light emitted from the first illumination unit 57 towards a measurement point Pm on the blank 1 forms a second angle −α in relation to a vertical axis V defined by a normal vector N of the sheet surface of the blank 1. The second angle −α is a negative angle.

The absolute value of the second angle −α and the first angle φ may be equal. However, the first angle φ of the optical axis A is a positive angle.

Within the context of this application, a positive angle results from counterclockwise rotation from the vertical axis V. Consequently, a negative angle results from clockwise rotation from the vertical axis V.

As illustrated in FIG. 7*a*, a blank 1 with a reflective surface is illuminated by the first illumination unit 57. The second angle −α of the first illumination unit 57 of the first illumination module 56 is selected such that incident light rays from the first illumination unit 57 are directed to the reference mark 30 and specular reflected light rays from the reference mark 30 are directed into the entrance pupil 55 of the camera lens 53. In such a way, the specular reflected light rays from the reference mark 30 are directed into the camera 49.

Coatings such as varnishes are highly reflective, which makes them difficult to detect without creating a "mirror-reflection" effect into the entrance pupil 55 of the camera lens 53 of the camera 49. These types of coatings generate a specular reflection when illuminated.

The first illumination unit 57 is configured to emit diffused light rays which are directed towards the reference mark 30 from multiple directions. This ensures that reflected specular light rays are received through the entrance pupil 55 of the camera 49. The first illumination unit 57 comprises at least one light source 58 and a diffusive layer 59. The diffusive layer 59 is positioned over the at least one light source 58. The diffusive layer 59 is configured to scatter the transmitted light rays from the light source 58 and provide a homogenous radiating surface of diffused light. The diffusive layer 59 can be made from an optically diffusive material, such as Polymethylmethacrylat.

In the illustrated embodiment, the first illumination unit 57 of the first illumination module 56 is configured such that only light rays which are reflected by a portion of the field of view 51 on the blank 1 are received through the entrance pupil 55 of the camera lens 53. This portion is referred to as reflective illuminated area Ria. Hence, the reflective illuminated area Ria on the blank 1 is of a smaller surface area than area of the field of view 51 on the blank 1. The reference mark 30 thus needs to be placed in the reflective illuminated area Ria of the field of view 51 on the blank when an image of a reflective reference mark 30 is captured.

The camera 49 can be triggered by a time signal from the control unit 44 which is 20 issued when the optical sensor 52 registers a detection of the front leading edge 4 of the blank 1. The signal can be set to a time which corresponds to an arrival time of the reference mark 30 at the reflective illuminated area Ria of the field of view 51.

In an embodiment, the first illumination unit 57 can be elongated with a plurality of light sources 58 arranged side by side. The longitudinal extension of the illumination unit 57 is arranged perpendicular in relation to the direction of transportation T, which also coincides with a longitudinal extension of the reference mark 30 on the blank 1.

The light sources 58 can be arranged in a row or in a plurality of rows. The light sources 58 may be arranged on a printed circuit board (PCB). The distance between the light sources are selected such that a homogeneous illumination of the diffusive layer 59 is obtained.

When the inspection device 42 is mounted in the converting machine 10, the camera axis A is arranged at the first angle φ in relation to the vertical axis V. The horizontal axis is defined by the printed surface on the blank 1 and the vertical axis V is perpendicular thereto. The first angle φ enables the camera 49 to capture specular light rays reflected at an angle from the reference mark 30. The first angle φ may be between 1° and 15°, and preferably about 5°.

In a preferred embodiment, a second illumination module 60 is also provided. The second illumination module 60 is configured to illuminate printed colors which generate a diffuse reflection when illuminated with specular light rays.

These types of colors include for instance water-based or solvent-based inks. Due to the diffuse reflection of the light rays from the reference mark 30, the camera 49 will receive reflected light rays into the entrance pupil 55 of the camera lens 53. The second illumination module 60 is configured to provide a homogeneous illumination of the reference mark 30 on the blank 1.

As best seen in FIGS. 4 and 7*b*, which illustrate a reflective surface on a blank 1 which is illuminated with the second illumination module 60. The second illumination module 60 comprises at least one illumination unit 62, 63, 65 which is arranged to emit light at a third angle β in relation to the vertical axis V defined by a normal vector N of the surface of the blank 1. The third angle ß is selected such that incident light rays from the at least one illumination unit 62, 63, 65 of the second illumination module 60 are directed to the reference mark 30 and specular reflected light rays from the reference mark 30 are directed outside the entrance pupil 55 of the camera lens 53. This enables the camera 49 to capture a sharp image of the reference mark 30 without glare. Hence, when illuminating a reflective surface, the specular reflected light rays are not received in the entrance pupil 55 of the camera lens 53. The full field of view 51 on the blank 1 may be illuminated by the second illumination module.

The at least one illumination unit 62, 63, 65 can be elongated and may comprise a plurality of light sources 64 arranged in a line. The longitudinal extension of the at least one illumination unit 62, 63, 65 is arranged perpendicular in relation to the direction of transportation T of the blank 1.

The at least one illumination unit 62, 63, 65 of the second illumination module 60 may comprise a continuous line of light sources 64 arranged at a constant distance from each other. Alternatively, the at least one illumination unit 62, 63, 65 may only comprise light sources 64 located at the extremities of the line. In such a way, the light sources 64 are arranged in a square around the camera 49.

In an embodiment, an additional second illumination unit 63 is arranged on an opposite side of the optical axis A of the camera 49 in relation to the first illumination unit 62. In such a way, a further improved and homogenous illumination of the field of view 51 on the blank 1 can be achieved. In an embodiment, a third illumination unit 65 is further provided on at least one of the sides of the camera 49.

Each illumination unit 62, 63, 65 may be configured to emit light towards the blank 1 at a different third angle β. Hence, in the illustrated example in FIG. 7*b*, there are three illumination units 62, 63, 65 and their respective angles of emitted light can be referred to as β1, β2, β3. These angles are selected such that the specular reflection of light rays is directed outside of the entrance pupil of the camera 49. As long as the reflected light rays are not received in the entrance pupil 55 of the camera 49, the angles β1, β2, β3 may all be different.

The first illumination module 56 and the second illumination module 60 can be operated at the same time, whereby the camera 49 captures one image of the reference mark 30. Alternatively, either the first illumination module 56 or the second illumination module 60 is operated and an image can be captured by the camera 49. In another embodiment, only one of a plurality of illumination units 62, 63, 65 is operated.

Figure 9A:
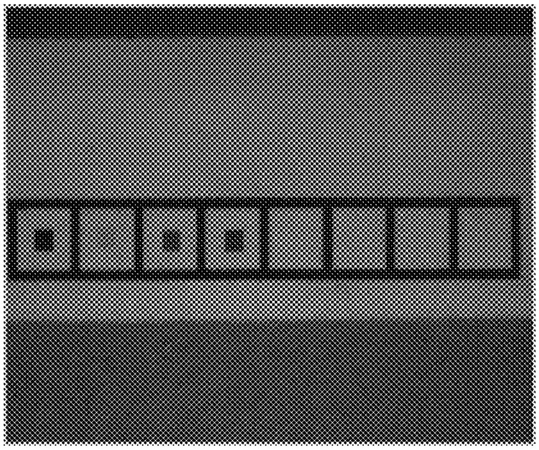
FIGS. 9*a* and 9*b* are images taken with and without a first illumination module of the preset invention.
Figure 9B:
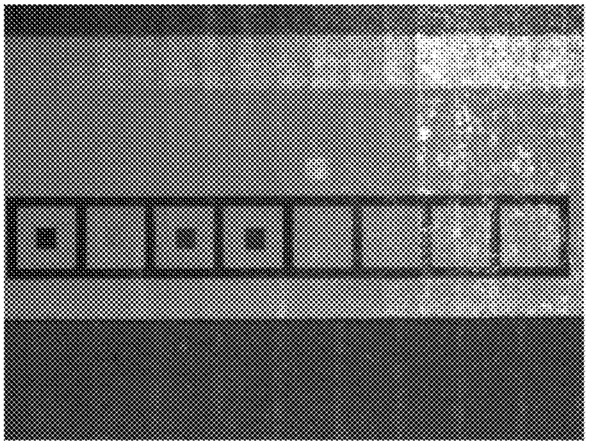

For inks generating a diffuse reflection when illuminated, the first illumination module 56 can be disabled. Depending on the color and reflective characteristics of the coatings, it can thus be sufficient to only illuminate the reference mark 30 with the second illumination module 60. In such a way, reflections from reflective surfaces on the blank can be avoided. This is illustrated in FIG. 9*b* where the blank 1, when illuminated with the first illumination module 56, generates reflections in smooth areas which have been unintentionally rubbed by friction in the converting machine 10. In FIG. 9*a*, the blank 1 is only illuminated with the second illumination module 60 and displays less reflections.

The first illumination module 56 and the second illumination module 60 can be operated at the same time, whereby the camera 49 captures one image of the reference mark 30. Alternatively, either the first illumination module 56 or the second illumination module 60 is operated and an image can be captured by the camera 49. In another embodiment, only one of a plurality of illumination units 62, 63, 65 is operated.

The light intensity from the first 56 and second illumination modules 60 can be varied. This makes it possible to adapt the illumination settings depending on the reference mark characteristics. Especially for reflective coatings (inks or varnishes), the illumination can be calibrated to obtain a detectable reflection.

Figure 5:
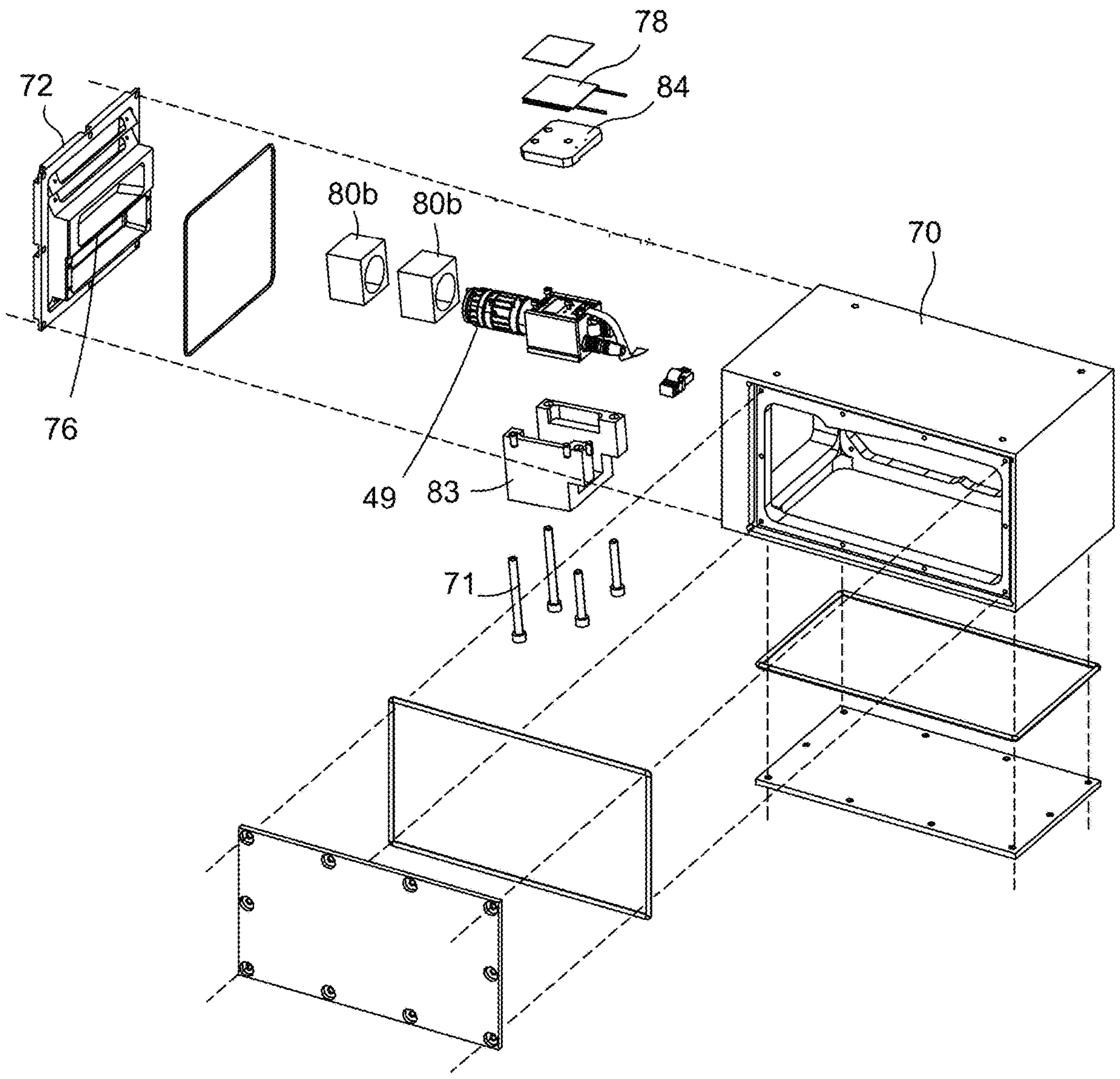
FIG. 5 is an exploded view showing the inspection device of FIG. 4.

As best seen in FIGS. 5 and 6, the camera 49 is mounted inside an external housing shroud 70 of the inspection device 42. On a top side of the housing shroud 70, a cover 72 is provided. The cover is provided with a transparent surface 73, such as a glass surface 73. The external housing shroud 70 is designed to provide a hermetically sealed housing which is arranged around and encloses the camera 49. The level of sealing level may for instance be IP64.

The external housing shroud 70 may comprise a wall 74 with varying thickness. The varying thickness enable a larger traversing wall for fasteners 71 and provides rigidity to the wall 74. The wall 74 of the housing shroud 70 may further comprise a biased section 75, which forms the first angle φ with the longitudinal extension of the external housing shroud 70. This allows the optical axis A of the camera 49 to form the first angle φ with the vertical axis V. The vertical axis V coincides with the longitudinal direction of the external housing shroud 70, and the camera 49 is thus directed through an opening 76 in the cover 72 arranged in-between the illumination modules 56, 60.

A thermoelectric element 78 is arranged between the camera 49 and the external housing shroud 70. The thermoelectric element 78 can be a Peltier element 78. The camera 49 comprises an optical module 49*a* and an electronic processing module 49*b*. The electronic processing module 49*b* comprises electronic parts that are heat-sensitive and the camera 49 is preferably arranged within the inspection device 42 such that the electronic parts are arranged close to the thermoelectric element 78. In such a way, the electronic processing module 49*b* is thermally connected to the thermoelectric element 78.

An isolating inner housing 80 is arranged inside the external housing shroud 70 and is configured to enclose the camera 49. The inner housing 80 may comprise a first housing part 80*a* arranged around the electronic processing module 49*b* of the camera 49 and a second housing part 80*b* arranged around the optical module 49*a* of the camera 49. The second housing part 80*b* can be tubular.

The first housing part 80*a* may comprise a recess 82, in which the second housing part 80*b* is partially received. This allows for a modular design and access to the optical module 49*a* of the camera 49 without dismantling the first housing part 80*a*.

As best seen in FIG. 5, the first housing part 80*a* comprises an isolating portion 83 and a thermally conductive portion 84. The thermally conductive portion 84 comprises a heat-conductive plate 84, for instance a metal plate. For example, the heat-conductive plate 84 can be made from aluminum or silver. The thermoelectric element 78 is positioned between the heat-conductive plate 84 and the external housing shroud 70. The heat-conductive plate 84 distributes and spreads the cold from the thermoelectric element 78 to the electronic processing module 49*b* of the camera 49. The camera is fixed to the external housing shroud 70 by at least one fastener 71. In the illustrated embodiment, a plurality of fasteners 71, such as four fasteners 71 connect the inner housing 80 of the camera 49 to the external housing shroud 70.

The thermoelectric element 78 produces a warm side and a cold side when a current is applied over the two sides. Consequently, the cold side of the thermoelectric element 78 is in contact with the thermally conductive plate 84 and the warm side of the thermoelectric element 78 is in contact with the external housing shroud 70. In such a way, the processing module 49*b* of the camera 49 is cooled, while the external housing shroud 70 can be used to transfer the heat away from the thermoelectric element 78.

As best seen in FIG. 3, the inspection device 42 may be placed under a vacuum transfer 9 of the flexographic printing module 15. The vacuum transfer 9 is configured to convey the blank 1 forward in the direction of transportation T. The vacuum transfer 9 may comprise drive rollers and suction openings. Alternatively, the vacuum transfer can be located below the inspection device 42. The vacuum suction force from the vacuum transfer 9 induces an airflow over the external housing shroud 70 which provides a heat transfer to the ambient air.

A dryer module 13 may be located after the flexographic printing module 15 to ensure that the ink is dried before the blank 1 travels to subsequent modules such as a die-cutting or a folding module. The dryer module 13 operates by blowing hot air at the printed side of the blank 1.

By integrating the thermoelectric element 78 as previously described into the present inspection device 42, a cooling effect can be achieved to reduce heating the camera 49 with stray heat from the dryer. Moreover, a dust-free environment for the camera 49 can be obtained.

The invention claimed is:

1. An inspection device for a converting machine, the inspection device comprising:
- a camera configured to capture an image of a portion of a blank provided with a reference mark, the camera being arranged inside an external housing shroud,
- wherein the camera comprises an optical module and an electronic processing module,
- wherein an isolating inner housing is arranged inside the external housing shroud and is enclosing the camera,
- wherein a thermoelectric element is arranged between the isolating inner housing and the external housing shroud, wherein a cold side of the thermoelectric element directly abuts an external surface of the isolating inner housing and a warm side of the thermoelectric element directly abuts an internal surface of the external housing shroud to cool the camera, and
- wherein the electronic processing module is thermally connected to the thermoelectric element.

2. The inspection device according to claim 1, wherein the thermoelectric element is a Peltier element.

3. The inspection device according to claim 1, wherein the isolating inner housing comprises a first housing part arranged around the electronic processing module of the camera and a second housing part arranged around the optical module of the camera.

4. The inspection device according to claim 3, wherein the second housing part is tubular.

5. The inspection device according to claim 3, wherein the first housing part comprises a recess and wherein the second housing part is partially received within the recess.

6. The inspection device according to claim 3, wherein the first housing part comprises an isolating portion and a thermally conductive portion, and wherein the thermally conductive portion comprises a heat-conductive plate, and wherein the thermoelectric element is positioned between the heat-conductive plate and the external housing shroud.

7. The inspection device according to claim 6, wherein the heat-conductive plate distributes and spreads cold from the thermoelectric element to the electronic processing module of the camera.

8. The inspection device according to claim 1, wherein the external housing shroud is hermetically sealed.

9. The inspection device according to claim 1, wherein a cover of the external housing shroud is provided with a glass surface.

10. The inspection device according to claim 1, wherein a wall of the external housing shroud comprises a biased section, which forms a first angle with a longitudinal extension of the external housing shroud, whereby an optical axis of the camera is positioned at the first angle in relation to a vertical direction.

11. A converting machine comprising the inspection device according to claim 1, the converting machine comprising a flexographic printing module and at least one vacuum transfer unit, wherein the at least one vacuum transfer unit is arranged such that a flow of air is generated around the external housing shroud.

12. The converting machine according to claim 11, wherein the flexographic printing module comprises at least a first printing unit and a second printing unit and wherein the inspection device is located after the second printing unit.

13. The converting machine according to claim 11, wherein the at least one vacuum transfer unit is located vertically above the inspection device.

14. The converting machine according to claim 11, wherein the at least one vacuum transfer unit is located vertically below the inspection device.

15. The converting machine according to claim 11, wherein a vacuum suction force from the at least one vacuum transfer unit induces an airflow over the external housing shroud which provides a heat transfer to ambient air.

16. The converting machine according to claim 11, further comprising a printing quality control system comprising the inspection device, a control unit, and a memory, wherein the printing quality control system is configured to detect and measure a longitudinal displacement and a lateral displacement between different colors and coatings in the reference mark.

17. The inspection device according to claim 1, wherein the external housing shroud is configured to transfer heat away from the thermoelectric element.

18. The inspection device according to claim 1, further comprising an illumination system comprising a first illumination module comprising at least one illumination unit configured to emit diffused light rays towards the reference mark.

19. The inspection device according to claim 18, further comprising a second illumination module comprising at least one illumination unit arranged to emit light at a third angle in relation to a vertical axis, such that specular reflected light rays from the reference mark are directed outside an entrance pupil of a camera lens.

20. The inspection device according to claim 1, wherein the electronic processing module comprises heat-sensitive electronic parts arranged close to the thermoelectric element.

* * * * *